United States Patent [19]

Revell

[11] 4,305,740

[45] Dec. 15, 1981

[54] FILTER MATERIAL CHARGING APPARATUS

[75] Inventor: Alan Revell, Louisville, Ky.

[73] Assignee: American Air Filter Company, Inc., Louisville, Ky.

[21] Appl. No.: 818,298

[22] Filed: Jul. 25, 1977

[51] Int. Cl.³ .............................................. B01D 46/30
[52] U.S. Cl. ..................................... 55/479; 55/484; 55/DIG. 9; 222/564; 406/163; 406/168
[58] Field of Search ..................... 55/385 R, 474, 479, 55/512, 390, DIG. 9, 484; 210/268, 269; 302/59, 61; 222/564

[56] References Cited

U.S. PATENT DOCUMENTS

| | | | |
|---|---|---|---|
| 36,073 | 8/1862 | Clark | 302/61 X |
| 568,776 | 10/1896 | Leggett | 302/61 X |
| 853,942 | 5/1907 | Campbell | 302/61 X |
| 2,701,623 | 2/1955 | Schubert | 55/99 |
| 2,743,965 | 5/1956 | Mattson et al. | 302/59 |
| 2,796,237 | 6/1957 | Nettel | 55/474 X |
| 3,795,090 | 3/1974 | Barnebey | 55/479 X |
| 3,829,165 | 8/1974 | Boon | 302/59 |
| 3,871,712 | 3/1975 | Trutzschler | 302/59 |
| 4,004,885 | 1/1977 | Groenendaal et al. | 55/99 X |
| 4,049,405 | 9/1977 | Goldsmith et al. | 55/DIG. 9 X |

FOREIGN PATENT DOCUMENTS 1010459  6/1952  France ................................. 55/390

Primary Examiner—Kathleen J. Prunner
Attorney, Agent, or Firm—Thomas G. Anderson; Jon C. Winger

[57] ABSTRACT

A filter material charging apparatus for adding a gas treating material into gas treating cells contained in a filter housing includes an open bottomed gas treating material conveying channel and air evacuation conduits located in the filter housing over the gas treating cells. Air-borne filter material is delivered to the conveying channel from a source outside the filter housing. Baffles are located in the channel to distribute gas treating material over the length and breadth of the filter housing, and into the gas treating cells as the gas treating material exits the channel through its open bottom. The air which carried the filter material into the housing is evacuated from the interior of the filter housing by the air evacuating conduit.

23 Claims, 11 Drawing Figures

FILTER MATERIAL CHARGING APPARATUS

BACKGROUND OF THE INVENTION

The present invention relates to filter devices for the removal of radioactive contaminants from a gas stream, and more particularly to a device for adding filter material to such a filter device.

In recent years, there has been considerable activity in providing filtration equipment for nuclear power facilities. Typical nuclear filtration equipment includes gas treating or filter cells containing a filter material such as charcoal which cells are contained in a filter housing. A nuclear contaminated gas stream is routed into the filter housing through appropriate inlet apertures in the housing wall. Interior to the filter housing, the contaminated gas moves across and through the charcoal filled gas treating cells to remove the contaminants from the gas stream. After the gas stream has passed through the charcoal filled cells, the now clean gas exits the filter housing through appropriate outlet apertures in the housing wall and is routed away from the filter housing.

From time to time, as the charcoal in the filter cells becomes too contaminated for effective filtering it must be removed and disposed of, and the filter cells replenished with fresh charcoal.

The approaches to the problem of replenishing the filter cells with fresh charcoal have been varied.

One approach has been to form the filter cells as charcoal filter trays removably mounted in the filter housing. When the charcoal becomes contaminated, the filter housing is opened, the contaminated charcoal trays are removed and the charcoal somehow disposed of, and trays filled with fresh charcoal are inserted in their place. Some of the problems with this approach are that the filter housing must be opened thereby exposing the ambient or area surrounding the filter housing to radiation from the nuclear contaminants captured by the charcoal in the charcoal trays, and the trays of contaminated carbon must be handled in some manner during their removal and disposal with an inherent danger of exposing personnel and the ambient or area surrounding the filter housing to radiation from the nuclear contaminants captured by the charcoal in the trays.

Another approach has been to construct open topped fixed filter cells in a filter housing and provide sealable ports in the roof of the filter housing over and communicating with the interior of the filter cells. To replenish the filter cells with fresh carbon, the filter housing roof ports are opened, and fresh charcoal is introduced therethrough and into the filter cells. The charcoal could be introduced through the filter housing roof ports by means of a pipe having a discharge open end in communication with the port. Another means for introducing charcoal through the roof ports is to provide a hopper filled with fresh charcoal, which hopper can be mounted for movement over the roof of the filter housing. When the hopper is positioned over an open filter housing roof port, fresh charcoal is discharged through appropriate gates in its bottom side of the hopper to fall from the hopper downwardly through the open filter housing roof port into the filter cell there below. When one cell is filled, the hopper is moved to the next cell and the process repeated. One of the problems with this approach is that the filter housing must be opened thereby exposing the ambient or area surrounding the filter housing to radiation built up within the filter housing during the filtering operation as nuclear contaminated gas passes through the filter cells disposed therein. Another drawback is that an adequate amount of space must be provided over the filter housing roof to allow for the opening of the filter housing roof ports and the filling equipment, be it pipes, hoppers, or other means.

Yet another approach in a filter housing constructed with fixed open topped filter cells has been to provide a conduit having one open end which is horizontally disposed across the open tops of the filter cells within the filter housing. The conduit has downwardly facing apertures spaced along its length so that each of the spaced apertures is in registration with the open top of a different one of the filter cells. The open end of the conduit projects through one of the walls of the filter housing and is adapted to be connected to a filler pipe leading from a source of fresh charcoal located outside of the filter housing. Fresh charcoal is blown through the filler pipe from the source of fresh charcoal, and into the conduit through its open end. The fresh charcoal discharges downwardly out of the conduit through the apertures formed therein and falls downwardly through the tops of the filter cells and into the filter cells. It is desirable that the filter cells be overfilled to compensate for subsequent settling of the charcoal in the filters. In order to accomplish this overfilling with the above-discussed approach, a hill of charcoal is formed over each filter cell with the apex of the charcoal hill being beneath its respective conduit aperture and sides of the charcoal hill sloping downwardly toward the margins of the filter cell. A problem with this approach is that a possibility exists that there will be an inadequate amount of overfilling at the margins of the filter cells to adequately compensate for charcoal settling, thus, producing an area in the filter cell void of charcoal. Further, because the tops of the filter cells are open, some of the gas passing through the filter cells flows upwardly through the open top instead of from laterally front to back through the filter cell. Of course, the gas flowing through the open top of the filter cell must also be filtered. However, in the above-discussed approach, due to the uneven overfilling of the filter cells there is a possibility that there will be an insufficient amount of charcoal overfilling at the margins of each filter cell to adequately filter the gas passing upwardly through the open top of the filter cell. A further drawback is that an adequate amount of space over the top of the filter cells must be provided to form the hill of charcoal.

SUMMARY OF THE INVENTION

The present invention recognizes the problems associated with the prior art and provides a solution which is compact in physical size and straightforward, therefore, relatively inexpensive to manufacture and maintain.

More particularly, the present invention is a charging apparatus for adding a gas treating material into open topped gas treating cells contained in a filter housing, the charging apparatus comprising:

a gas treating material conveying channel disposed within the housing and spaced above the gas treating cells, the channel having an open bottom which faces downwardly toward the open tops of the gas treating cells;

means for directing at least a portion of the gas treating material generally directly downwardly out of the open bottom of the channel into the open topped gas treating cells; and, means for directing at least a portion of the gas treating material generally laterally outwardly of the open bottom of the channel.

BRIEF DESCRIPTION OF THE DRAWINGS

The following disclosure makes reference to the accompanying drawings wherein like numerals refer to like parts throughout the several views, and in which.

DETAILED DESCRIPTION OF THE PREFERRED EMBODIMENT

Figure 1:
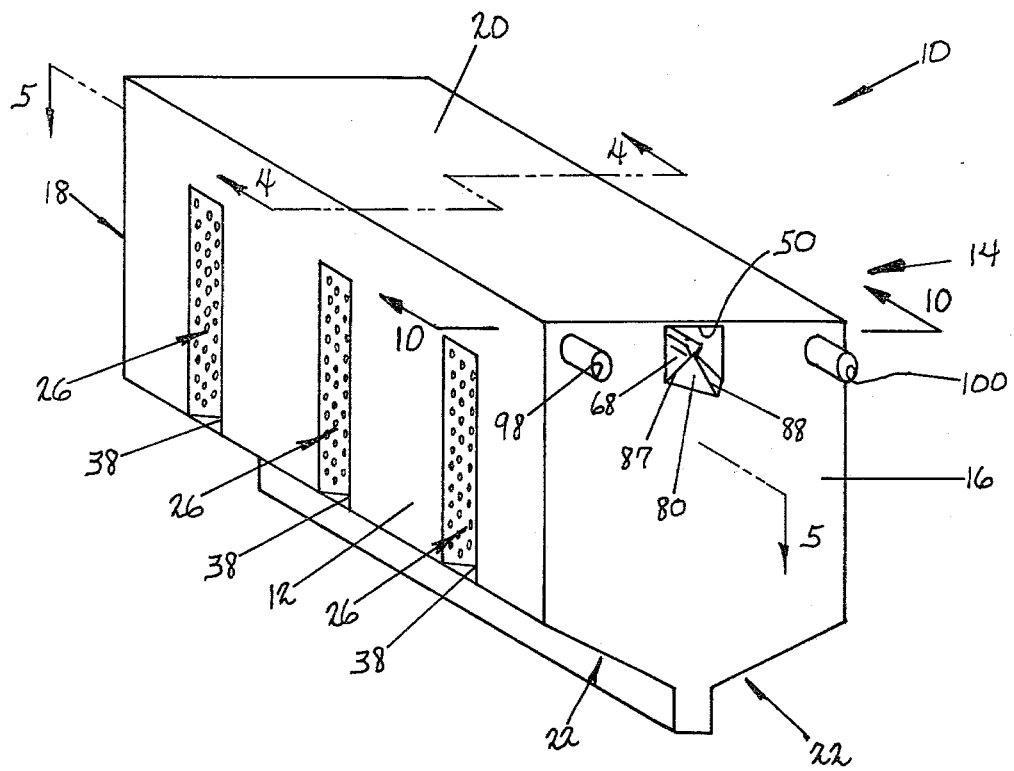
FIG. 1 is an isometric view of an exemplary filter housing incorporating the present invention.
Figure 2:
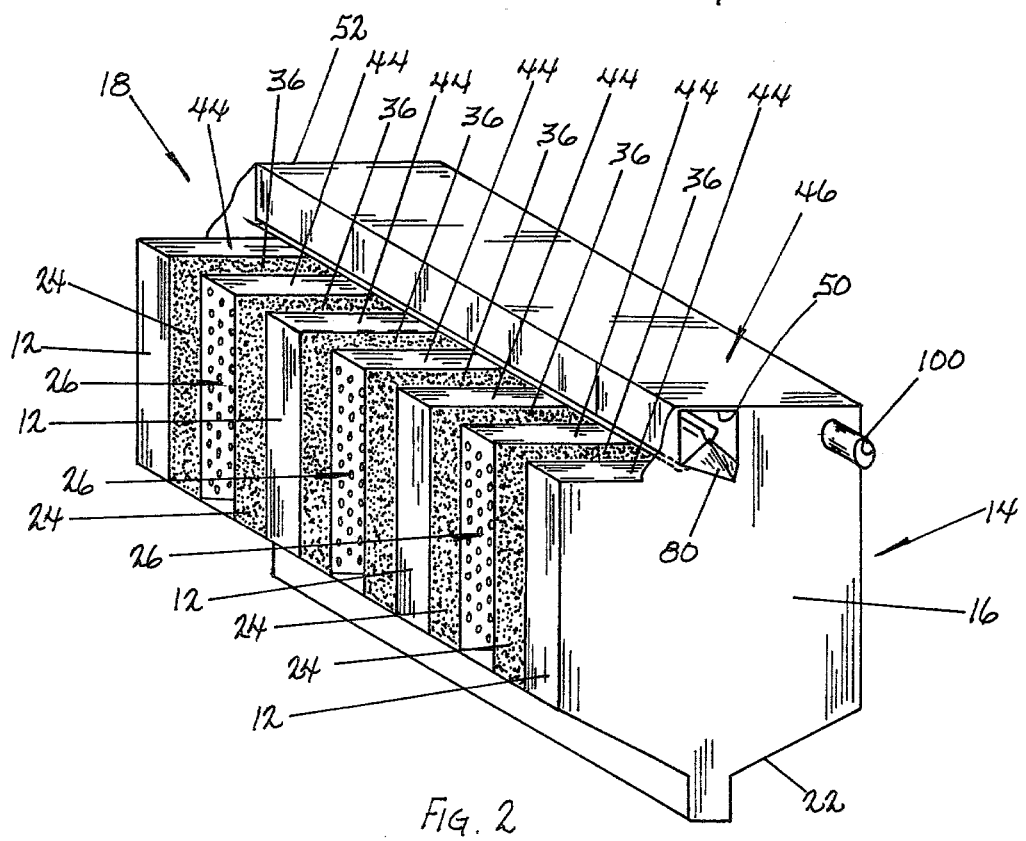
FIG. 2 is an isometric view similar to that of FIG. 1, but partially broken away to more clearly illustrate the internal components of the exemplary filter housing and filter material charging apparatus of the present invention.
Figure 3:
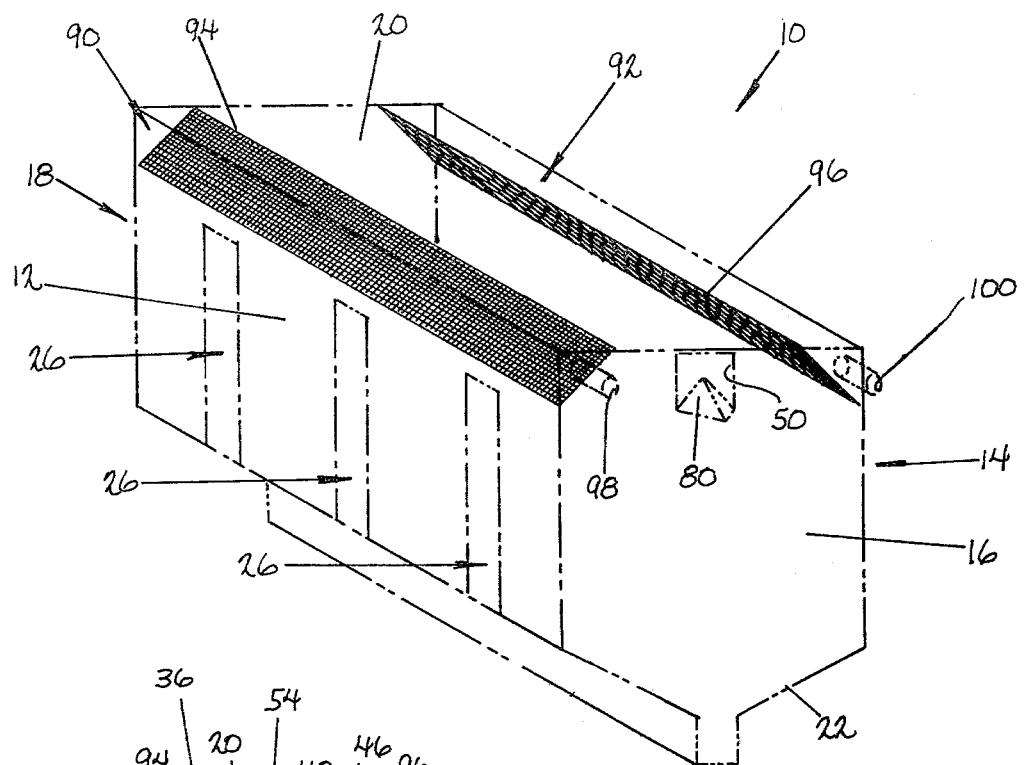
FIG. 3 is an isometric view of the filter housing of FIGS. 1 and 2 but in phantom lines to more clearly illustrate other components of the filter material charging apparatus of the present invention.

FIGS. 1-5 illustrate an exemplary filter housing 10 having parallel spaced apart front and back walls 12 and 14, respectively, spaced apart parallel side walls 16 and 18, a roof 20, and bottom walls 22 forming a hopper portion. The housing 10 contains a plurality of vertically oriented, spaced apart charcoal filter cells 24 defining therebetween a plurality of alternating dirty gas inlet passageways 26 and clean gas outlet passageways 28. The mottling in the figures indicates a particulate filter material such as charcoal.

Each filter cell 24 is defined between two parallel spaced apart vertically oriented gas previous walls 30 and 32. One wall, for example, wall 30, can be called an upstream wall because it is the wall through which the gas to be treated enters the filter cell, and the other wall, for example, wall 32, can be called the downstream wall because it is the wall through which the treated gas leaves the filter cell. The gas previous upstream and downstream walls 30 and 32 terminate a distance below the roof 20 of the filter housing 10 to form an overhead plenum 34 between the filter cells and the housing roof 20. The top of each filter cell is open, as denoted by the numeral 36, and is closed at its opposite ends by the front and back walls 12 and 14 of the filter housing 10.

The dirty gas inlet passageways 26 are each defined between facing upstream walls 30 of adjacently disposed filter cells 24 while the clean gas outlet passageways 28 are each defined between facing downstream walls 32 of adjacently disposed filter cells 24. Each dirty gas inlet passageway 26 is formed with an inlet aperture 38 at one of its ends through the housing front wall 12 while the opposite end of the dirty gas inlet passageway 26 is closed by the housing back wall 14. Similarly, each clean gas outlet passageway 28 is formed with an outlet aperture 40 at one of its ends through the housing back wall 14 while the opposite end of the clean gas outlet passageway is closed by the housing front wall 12. The bottom of each inlet and outlet passageway 26 and 28 is closed by a gas impervious bottom wall 42, and the top of each inlet and outlet passageway 26 and 28 is closed by a gas impervious top wall 44.

Figure 5:
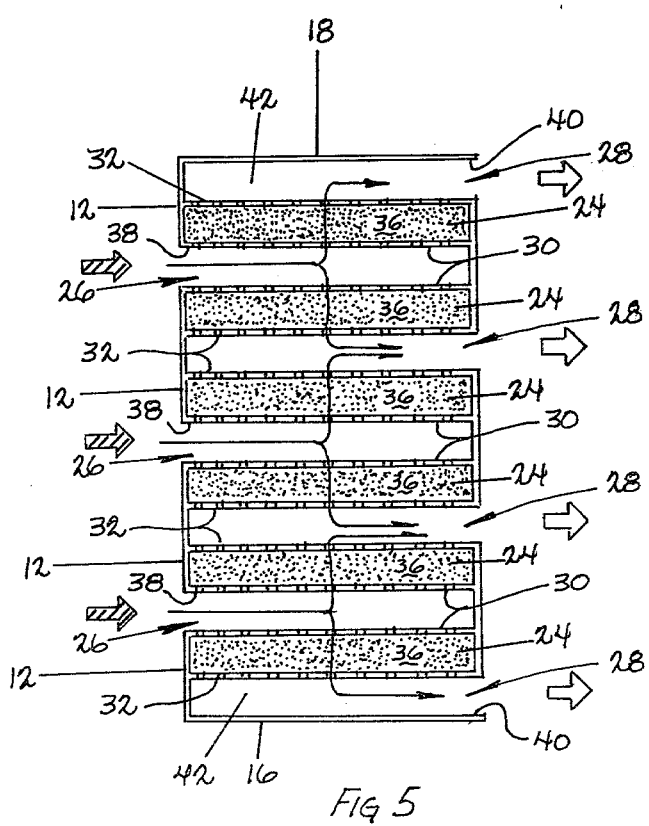
FIG. 5 is a horizontal cross-section view of the filter housing as viewed in the direction of arrows 5—5 in FIG. 1.
Figure 6:
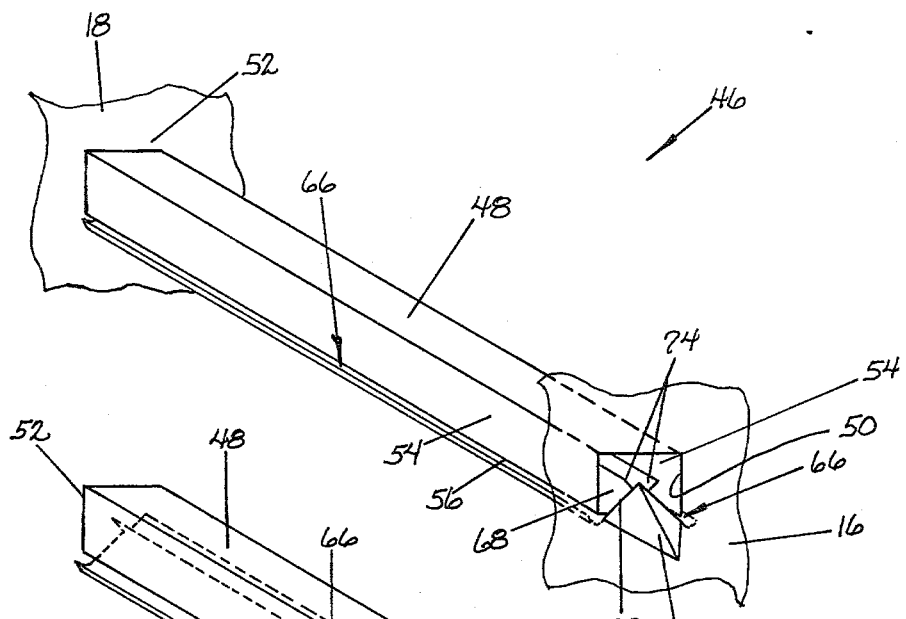
FIG. 6 is an enlarged isometric view of the present invention.
Figure 7:
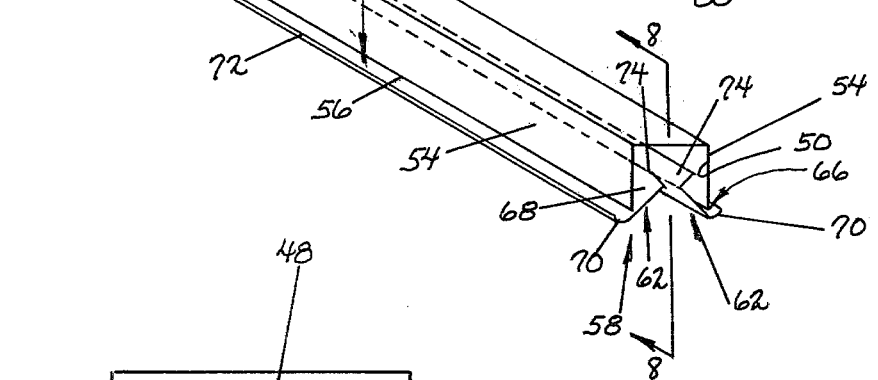
FIG. 7 is another enlarged isometric view of the present invention showing internal components.
Figure 8:
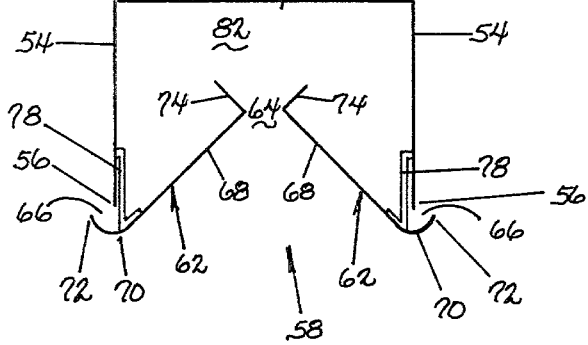
FIG. 8 is an enlarged end view of the present invention as viewed in the direction of arrows 8—8 in FIG. 7.
Figure 9:
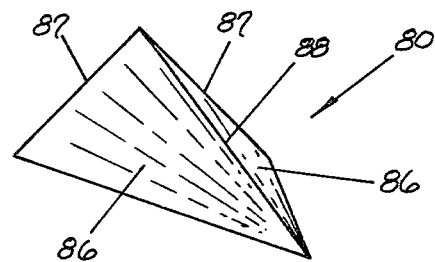
FIG. 9 is an enlarged isometric view of a component of the present invention.

With reference to FIG. 5, dirty or contaminated gas enters each of the dirty gas inlet passageways 26 through the dirty gas inlet apertures 38 as indicated by the cross-hatched arrows. Because the top, bottom and opposite end of each of the dirty gas inlet passageways 26 are closed, the contaminated gas flows through the gas pervious upstream walls 30 of the filter cells 24. In flowing through the charcoal filled filter cells 24, the contaminated gas is filtered and resulting clean gas flows out of the filter cells 24 through the gas pervious downstream walls 32 and into the clean gas outlet passageways 28 (see the flow arrows in FIG. 5). Because each of the clean gas outlet passageways 28 are closed at the top, bottom and one end, the clean gas leaves the clean gas outlet passageways 28 through the clean gas outlet aperture 40, as indicated by the block arrows.

From time to time, the charcoal in the filter cells 24 becomes too contaminated for effective filtering. When this occurs, the contaminated charcoal must be removed and fresh charcoal installed. The means for removing the contaminated charcoal is not shown nor discussed, for it does not constitute a part of the present invention and because any one of a variety of known charcoal removing means could be used.

A charging apparatus, generally denotd as the numeral 46, for adding fresh charcoal into the filter cells 24, after the contaminated charcoal has been removed, comprises an elongated gas treating material conveying channel 48 disposed within the housing 10 above the open tops 36 of the filter cells 24. The channel 48 longitudinally extends across the width of the housing 10 from one housing side wall 16 to the opposite housing side wall 18, and is laterally substantially equally spaced between the housing front wall 12 and housing back wall 14. The channel 48 comprises one open end 50 which is in registration with an appropriately configured aperture in one of the housing side walls, for example, housing side wall 16, while the opposite end 52 of the channel 48 abuts and is closed by the opposite housing side wall 18. Furthermore, the channel 48 has two parallel spaced apart depending longitudinal side walls 54 which each terminate at a bottom edge 56 defining between them an open bottom side 58 which extends the entire length of the channel 48. The channel open bottom side 58 faces downwardly toward the open tops 36 of the filtering cells 24. The open end 50 of the channel 48 is to be connected to a source of fresh charcoal (not shown) located outside the filter housing 10. Fresh charcoal is introduced into the channel 48 through its open end 50 and exits the channel 48 through its open bottom side 58. The charging apparatus 46 also comprises means for directing at least a portion of the fresh charcoal directly downwardly out of the open bottom 58 of the channel 48 into the open tops 36 of the filtering cells 24 and for directing at least a portion of the fresh charcoal generally laterally outwardly of the open bottom 58 of the channel 48.

The means for directing at least a portion of the fresh charcoal downwardly and at least a portion fresh charcoal generally laterally outwardly comprises two identically shaped elongated baffles 62 located in the channel 48. The baffles 62 are spaced apart and symmetrically disposed relative to the longitudinal center-line of the channel 48 and extend the length of the channel from its open end 50 to its opposite closed end 52. A centrally disposed elongated slot 64 which extends longitudinally and centrally of the open bottom side 58 of the channel 48 is, thus, defined between the spaced apart baffles 62.

Each baffle 62 extends from the interior of the channel 48 beneath and in spaced relationship to the bottom edge 56 of the depending channel side wall 54 adjacent to it. Thus, a pair of longitudinal slots 66 located on either side of and parallel to the centrally disposed slot 64 are defined between the baffles 62 and bottom edges 56 of the channel side walls 54. Each baffle 62 comprises a generally straight leg portion 68 projecting at an angle from the interior of the channel 48 generally outwardly and downwardly toward the bottom edge 56 of the adjacent channel side wall 54 and an arcuately shaped leg portion 70 continuing from the straight leg portion 68 and extending in spaced relationship beneath and concavely facing the bottom edge 56 of the adjacent channel side wall 54. The arcuately shaped leg portion 70 of each baffle 62 has a terminal edge 72 terminating a predetermined distance laterally of the adjacent channel side wall 54 outside of the channel 48. Preferably, the distance by which the arcuate leg portion 70 of each baffle 62 is spaced from the bottom edge 56 of the adjacent channel side wall 54 is substantially equal to the space by which the baffles 62 are spaced from each other interior to the channel 48. Likewise, the distance by which the terminal edge 72 of each baffle 62 is spaced from the bottom edge 56 of the adjacent depending channel side wall 54 is also substantially equal to the space by which the baffles 62 are spaced from each other interior to the channel 48. Each of the baffles 62 also comprises a flange 74 projecting at an angle from the end of the straight leg portion 68 opposite that end of the straight leg portion 68 from which the arcuate leg portion 70 extends. The flange 74 of each baffle 62 extends in a direction generally upwardly and away from the central slot 64 defined between the baffles 62. It is believed that each flange 74 adds strength and rigidity to its associated baffle 62 as well as cooperating with each other to form a funnel 76 to guide fresh charcoal being discharged from the interior of the channel through the central slot 64. Each baffle 62 can be attached to the channel 48 by means of, for example, a plurality of spaced apart attaching straps 78. The straps 78 are each connected at one of its ends to a baffle 62 and at its other end to the channel depending side wall 54 adjacent to the baffle 62.

The charcoal charging apparatus 46 also comprises guiding means for smoothly guiding a flow of air-borne charcoal through the open end 50 of the channel 48 and into the interior of the channel 48 above the central elongated slot 64. The guiding means comprises a guiding baffle 80 preceding the open end 50 of the channel 48 and attached to the exterior surface of the housing side wall 16. The guiding baffle 80 is configured to smoothly direct air-borne fresh charcoal through the open end 50 of the channel 48 and into that part, generally denoted as the numeral 82, of the channel 48 defined above the elongated central slot 64. In the figures, the guiding baffle 80 diverges in a direction toward the housing side wall 16 from a point spaced outwardly from the housing side wall 16. The guiding baffle 80 illustrated in the figures has two triangularly shaped surfaces 86 which are joined along and slope downwardly and outwardly from a common apex 88. The slope of such surfaces 86 corresponds to the slope or angle at which the straight leg portions 68 of the symmetrically disposed baffles 62 extends in the interior of the channel 48. The end 87 of each of the surfaces 86 at the divergent end of the guiding baffle 80 at the open end 50 of the channel 48 are in registration with the edge straight leg portion 68 of a different one of the symmetrical baffles 62 at the open end 50 of the channel 48, and the apex 88 of the guiding baffle 80 is in alignment with the longitudinal center-line of the centrally disposed elongated slot 64 defined between the symmetrical baffles 62.

FIGS. 3, 4, 10 and 11 illustrate two spaced apart parallel elongated air evacuating conduits 90 and 92 disposed within the housing 10 parallel to and spaced on either side of the elongated channel 48 above the open tops 36 of the filter cells 24. Each conduit 90 and 92 extends across the width of the housing 10 from one housing side wall 16 to the opposite housing side wall 18. As shown, the air evacuating conduit 90 is disposed in the top corner of the housing 10 formed by the housing front wall 12 and the housing roof 20. More particularly, the air evacuating conduit 90 is defined by the housing front wall 12, the housing roof 20 and a gas previous wall, such as a perforated plate or screen wall 94, diagonally disposed across the housing corner between the housing front wall 12 and the housing roof 20, and extending from the housing side wall 16 to the opposite housing side wall 18. Likewise, the figure shows the air evacuating conduit 92 disposed in the opposite top corner of the housing 10 which is parallel to that corner in which the conduit 90 is situated, i.e., the top corner of the housing 10 formed by the housing back wall 14 and the housing roof 20. More particularly, the air evacuating conduit 92 is defined by the housing back wall 14, the housing roof 20 and a gas pervious wall, such as a perforated plate or screen wall 96, diagonally disposed across the housing corner between the housing back wall 14 and the housing roof 20, and extending from the housing side wall 16 to the opposite housing side wall 18. The holes in the perforated plates 94 and 96 are smaller than the charcoal particles with which the filter cells 24 are filled so that charcoal particles will not pass through the perforated plates 94, 96 and enter the air evacuating conduits 90, 92. The interior of the air evacuating conduits 90, 92 are open to the exterior of the housing 10 through apertures 98 and 100, respectively, formed in, for example, side wall 16 of the housing 10. These apertures 98, 100 are to be connected to a low pressure source such as the low pressure side of a blower (not shown) by means of, for example, hoses (not shown).

Figure 4:
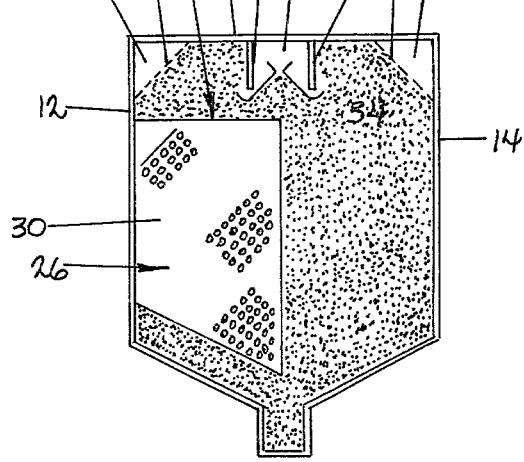
FIG. 4 is a staggered vertical cross-section of the filter housing as viewed in the direction of arrows 4—4 in FIG. 1.
Figure 10:
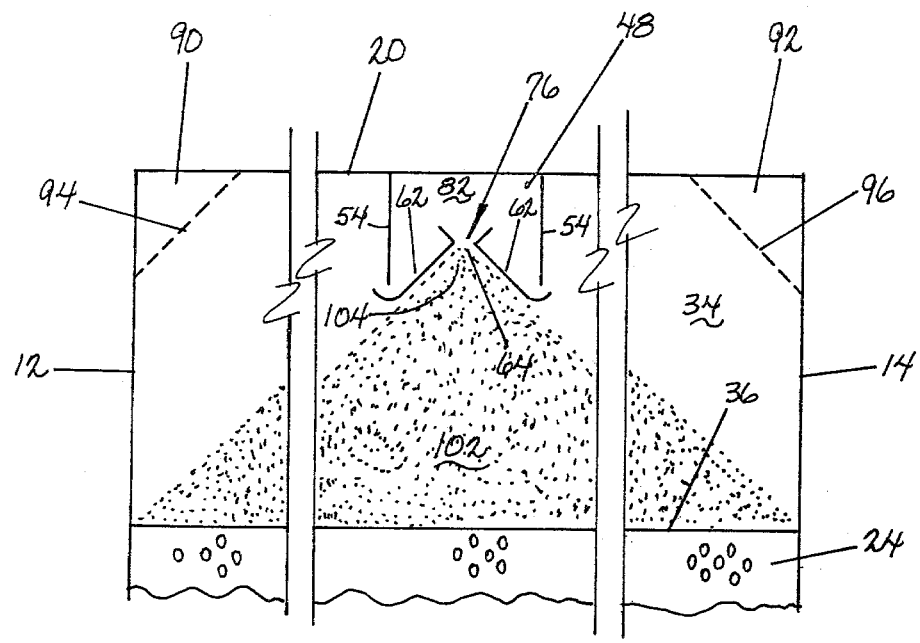
FIG. 10 is an enlarged, partially broken, fragmented vertical cross-sectional view of the present invention as viewed in the direction of arrows 10—10 in FIG. 1, illustrating one phase of its operation; and, FIG. 11 is an enlarged, partially broken, fragmented vertical cross-sectional view of the present invention taken in the same plane as that of FIG. 10, but illustrating another phase of its operation.
Figure 11:
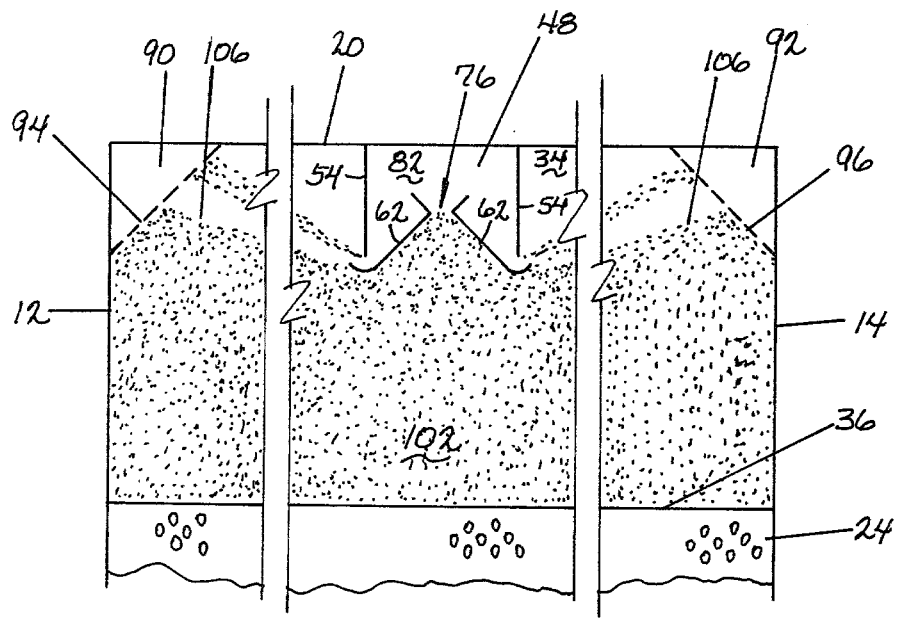

Now with particular reference to FIGS. 10 and 11; in operation, fresh charcoal is introduced into the interior of the channel 48 through a hose (not shown) to be connected at one of its ends to a source of fresh charcoal (not shown) and to be connected at its other end to the open end 50 of the channel 48. An air stream is generated by, for example, a blower, which air stream entrains the fresh charcoal from the fresh charcoal source and carries it through the hose interconnecting the fresh charcoal source and the channel 48. The air-borne fresh charcoal first comes into contact with the guiding baffle 80 which smoothly routes the gas-borne fresh charcoal through the open 50 of the channel 48 and into the part 82 of the channel interior above the symmetrically disposed baffles 62. The guiding baffles 80 has advantages over a blunt transition at the open end 50 into the channel 48 in that the diverging guiding baffle 80 provides a smooth transition for the charcoal carrying air stream as it enters the channel 48 from the hose thus preventing eddy currents which may adversely affect the operation of the charging apparatus, and further prevents the air-borne fresh charcoal particles from being broken up as could occur by impaction against a blunt transition from the hose into the channel 48. From the interior part 82 of the channel 48 above the symmetrical baffles 62, the air-borne fresh charcoal, or at least a major portion of it, exits through the centrally disposed elongated slot 64 defined between the symmetrical baffles 62 and continues generally downwardly toward the open tops 36 of the filter cells 24. After the filter cells 24 have been filled with fresh charcoal, additional fresh charcoal is introduced into the housing 10 to overfill the filter cells 24. Thus, a hill 102 of charcoal is formed (see FIG. 10) with sloping sides equal to the angle of repose of the charcoal. The overfilling process continues until the peak 104 of the charcoal hill 102 blocks the centrally disposed elongated slot 64. When the centrally disposed elongated slot 64 is blocked, thus preventing the exit of any more fresh charcoal through it, the air-borne fresh charcoal exits the interior part 82 of the channel 48 above the centrally disposed slot 64 in substantially equal portions through each of the pair of longitudinal side slots 66, as indicated in FIG. 11. In passing through the slots 66, the air-borne fresh charcoal is directed laterally outwardly of both the channel side walls 54 and in a generally upward direction by the arcuate leg portions 70 of the baffles 62 toward the housing front and back walls 12 and 14, respectively. Slopes of charcoal 106 are thus formed which slant downwardly from the housing front and rear walls 12 and 14 toward the channel 48. As the inclination of these charcoal slopes 106 reaches the angle of repose of the charcoal and the amount of fresh charcoal being deposited thereon through the longitudinal side slots 66 increases, the fresh charcoal will slide down the slopes 106 toward the channel 48, thus, filling in the valleys formed between the charcoal hill 102 and charcoal slopes 106. The evacuating conduits 90, 92 prevent the incoming air, which carries the fresh charcoal, from being trapped within the housing 10 and causing an air pressure build-up which may result in the formation of pockets, or air locks, of high pressure air within the housing 10. Such air locks will resist the movement of fresh charcoal into the vicinity of the air locks and cause areas within the housing which are void of fresh charcoal and hinder uniform filling of the housing 10 with charcoal. The incoming air, which carries the charcoal, is continuously drawn out of the overhead plenum 34 into the air evacuating conduits 90, 92 through their respective gas pervious walls 94, 96 by the aspirating action or suction created within the air evacuating conduits 90, 92 by the source of low pressure to be connected to apertures 98, 100. That is, the incoming air which carries the charcoal is drawn into the air evacuating conduits 90, 92 by the source of low pressure. The air drawn into the air evacuating conduits 90, 92 is subsequently removed from the air evacuation conduits 90, 92 through their respective apertures 98, 100 in the side wall 16 of the housing 10. This process continues until the filter cells 24 are filled, and a virtually even amount of charcoal has been deposited over the filter cells 24 across the width and breadth of the housing 10 in the overhead plenum 34 of the housing 10 as illustrated in FIG. 4.

It is important that an even amount of charcoal be deposited above the filter cells 24. Because the filter cells 24 have open tops 36 through which they are filled, part of the contaminated gas to be filtered will tend to pass upwardly through the filter cells 24 and out of the filter cell open tops 36. The charcoal deposited over the filter cells 24 in the overhead plenum 34 will filter any of the contaminated gas which may tend to exit through the open tops 36 of the filter cells. Comparing this to the prior art, which only forms charcoal hills over the tops of the filter cells, similar to charcoal hill 102 depicted in FIG. 10, the depth of charcoal over the filter cells is uneven diminishing toward the ends or margins of the filter cells. The result is that there could very likely be an insufficient amount of charcoal overfilling the margins or ends of the filter cells 24 to adequately filter any contaminated gas passing through the open filter cells tops 36. This condition is aggravated when the charcoal overfilling the filter cells 24 becomes compacted and settles. In the prior art, when this occurs, it is a distinct possibility that the level of charcoal, particularly at the margins or ends of the filter cells 24, will even fall below the open tops of the filter cells 24. This occurrence is precluded because the present invention not only evenly fills the plenum 34 over the open tops 36 of the filter cells 24, but also essentially completely fills the plenum 34 with charcoal to compensate for charcoal settling while still maintaining an adequate and equal amount of charcoal over the filter cells 24 for filtering contaminated gas passing upwardly through the open top 36 of each filter cell 24.

The foregoing detailed description is given primarily for clarity of understanding and no unnecessary limitations should be understood therefrom for other modifications will be obvious to those skilled in the art upon reading this disclosure and may be made without departing from the spirit of the invention or the scope of the appended claims.

I claim:
1. A charging apparatus for adding a gas treating material into open topped gas filter cells contained in a filter housing, the charging apparatus comprising:
   gas treating material conveying elongated channel means disposed within the housing and spaced above the gas filter cells, the gas treating material conveying elongated channel means having an open bottom which faces downwardly toward the open tops of the gas filter cells;
   means for directing at least a portion of the gas treating material generally directly downwardly out of the open bottom of the gas treating material conveying elongated channel means; and, means for directing at least a portion of the gas treating material generally laterally outwardly of the open bottom of the gas treating material conveying elongated channel means after said means for directing at least a portion of the gas treating material generally directly downwardly becomes blocked by gas treating material deposited beneath it.

2. The charging apparatus of claim 1 wherein the means for directing at least a portion of the gas treating material generally laterally outwardly of the gas treating material conveying elongated channel means comprises means for directing a substantially equal portion of the gas treating material generally laterally outwardly to both longitudinal sides of the open bottom of the gas treating material conveying elongated channel means.

3. The charging apparatus of claim 2 wherein the means for directing a substantially equal portion of the gas treating material generally laterally outwardly to both longitudinal sides of the open bottom of the gas treating material conveying elongated channel means comprises means for concurrently directing the gas treating material in a generally upwardly direction.

4. The charging apparatus of claim 3 wherein:
the means for directing at least a portion of the gas treating material generally downwardly out of the open bottom of the gas treating material conveying elongated channel means comprises means defining a slot longitudinally centrally disposed to the open bottom of the gas treating material conveying elongated channel means; and,
the means for directing substantially equal portions of the gas treating material generally laterally outwardly to both longitudinal sides of the open bottom of the gas treating material conveying elongated channel means and the means for concurrently directing the gas treating material in a generally upwardly direction comprises means defining a pair of slots disposed on opposite sides of and parallel to the slot longitudinally centrally disposed to the open bottom of the gas treating material conveying elongated channel means.

5. The charging apparatus of claim 4 wherein:
the gas treating material conveying elongated channel means comprises two spaced apart parallel depending walls, each wall terminating at a bottom free edge, which bottom free edges define between them the open bottom of the gas treating material conveying elongated channel means;
the means defining the slot longitudinally centrally disposed to the open bottom of the gas treating material conveying elongated channel means comprises a pair of identically shaped symmetrically disposed baffles disposed within the gas treating material conveying elongated channel means and spaced apart to either side of the longitudinal axis of the gas treating material conveying elongated channel means whereby the slot longitudinally centrally disposed to the open bottom of the gas treating material conveying elongated channel means is defined between the baffles; and,
the means defining the pair of slots disposed on opposite sides of and parallel to the slot longitudinally centrally disposed to the open bottom of the gas treating material conveying elongated channel means comprises the symmetrically disposed baffles, each of which extends from the interior of the gas treating material conveying elongated channel means in spaced relationship to and beneath the bottom free edge of the depending wall adjacent to it, whereby a different one of the pair of slots disposed on opposite sides of and parallel to the slot longitudinally centrally disposed to the bottom of the gas treating material conveying channel means is defined between a different one of the symmetrically disposed baffles and the bottom free edge of the depending wall beneath which that baffle extends.

6. The charging apparatus of claim 5 wherein each of the symmetrically disposed baffles comprises:
a generally straight leg portion projecting at an angle from the interior of the channel means generally outwardly toward the bottom edge of the depending wall adjacent to it; and,
an arcuately shaped leg portion continuing from the straight leg portion and extending in spaced relationship to and beneath, and concavely facing the bottom edge of the adjacent depending wall.

7. The charging apparatus of claim 6 wherein the distance by which the symmetrically disposed baffles are spaced from each other interior to the gas treating material conveying elongated channel means is substantially equal to the distance by which the arcuate leg portion of each of the symmetrically disposed baffles is spaced from the bottom free edge of its adjacent depending wall.

8. The charging apparatus of claim 6 wherein the arcuately shaped leg portion of each baffle terminates at an edge a predetermined distance laterally outwardly of the gas treating material conveying elongated channel means from the depending wall adjacent to it.

9. The charging apparatus of claim 8 wherein the terminal edge of the arcuately shaped leg portion of each baffle is spaced from the bottom free edge of the adjacent depending wall of the gas treating material conveying elongated channel means by a distance substantially equal to the distance by which the symmetrically disposed baffles are spaced from each other interior to the gas treating material conveying elongated channel means.

10. The charging apparatus of claim 6 wherein each of the symmetrically disposed baffles further comprises a flange member extending from the end of the straight leg portion opposite that end of the straight leg portion from which the arcuate leg portion extends, the flange member projecting in a direction generally upwardly and away from the slot longitudinally centrally disposed to the open bottom of the gas treating material conveying elongated channel means defined between the symmetrically disposed baffles.

11. The charging apparatus of claim 5 further comprising means for receiving the gas treating material into the gas treating material conveying elongated channel means.

12. The charging apparatus of claim 11 wherein the means for receiving the gas treating material into the gas treating material conveying elongated channel means comprises one end of the gas treating material conveying elongated channel means being open to the exterior of the filter housing to provide for the passage of the gas treating material into the gas treating material conveying elongated channel means.

13. The charging apparatus of claim 12, further comprising means for smoothly guiding the flow of the gas treating material through the open end of the gas treating material conveying elongated channel means and into the interior of the gas treating material conveying elongated channel means.

14. The charging apparatus of claim 13 wherein the means for smoothly guiding the gas treating material into the gas treating material conveying elongated channel means through its open end comprises a guiding baffle preceding the open end of the gas treating material conveying elongated channel means and configured to direct the gas treating material into that part of the interior of the gas treating material conveying elongated channel means defined by the depending walls and the symmetrically disposed baffles.

15. The charging apparatus of claim 14 wherein the guiding baffle diverges from a location spaced outwardly of the housing toward the open end of the gas treating material conveying elongated channel means.

16. The charging apparatus of claim 12 wherein the end of the gas treating maerial conveying elongated channel means opposite the open end of the gas treating material conveying elongated channel means is closed.

17. The charging apparatus of claim 5 wherein each of the symmetrically disposed baffles extends the length of the gas treating material conveying elongated channel means.

18. The charging apparatus of claim 5 wherein each of the symmetrically disposed baffles is connected to the gas treating material conveying elongated channel means.

19. The charging apparatus of claim 18 wherein the symmetrically disposed baffles are each attached to a different one of the depending walls of the gas treating material conveying elongated channel means by a plurality of spaced apart straps, each strap being connected at one of its ends to one of the symmetrically disposed baffles and at its other end to one of the depending walls of the gas treating material conveying elongated channel means.

20. The charging apparatus of claim 1 wherein the gas treating material conveying elongated channel means is laterally equally spaced between two walls of the filter housing.

21. The charging apparatus of claim 1 wherein the gas treating material conveying elongated channel means longitudinally extends across the filter housing.

22. The charging apparatus of claim 1, further comprising:
at least two spaced apart parallel air evacuation conduits disposed within the housing and spaced above the open tops of the gas filter cells; and,
each of the air evacuation conduits comprises:
(a) a gas pervious wall to provide for the passage of air therethrough from the interior of the housing into the air evacuation conduit; and,
(b) aperture means at one end of the conduit to provide for the removal of the air from the conduit.

23. The charging apparatus of claim 22 wherein the air evacuation conduits are equally spaced to either lateral side of the gas treating material conveying elongated channel means.

* * * * *